Patented Jan. 25, 1949

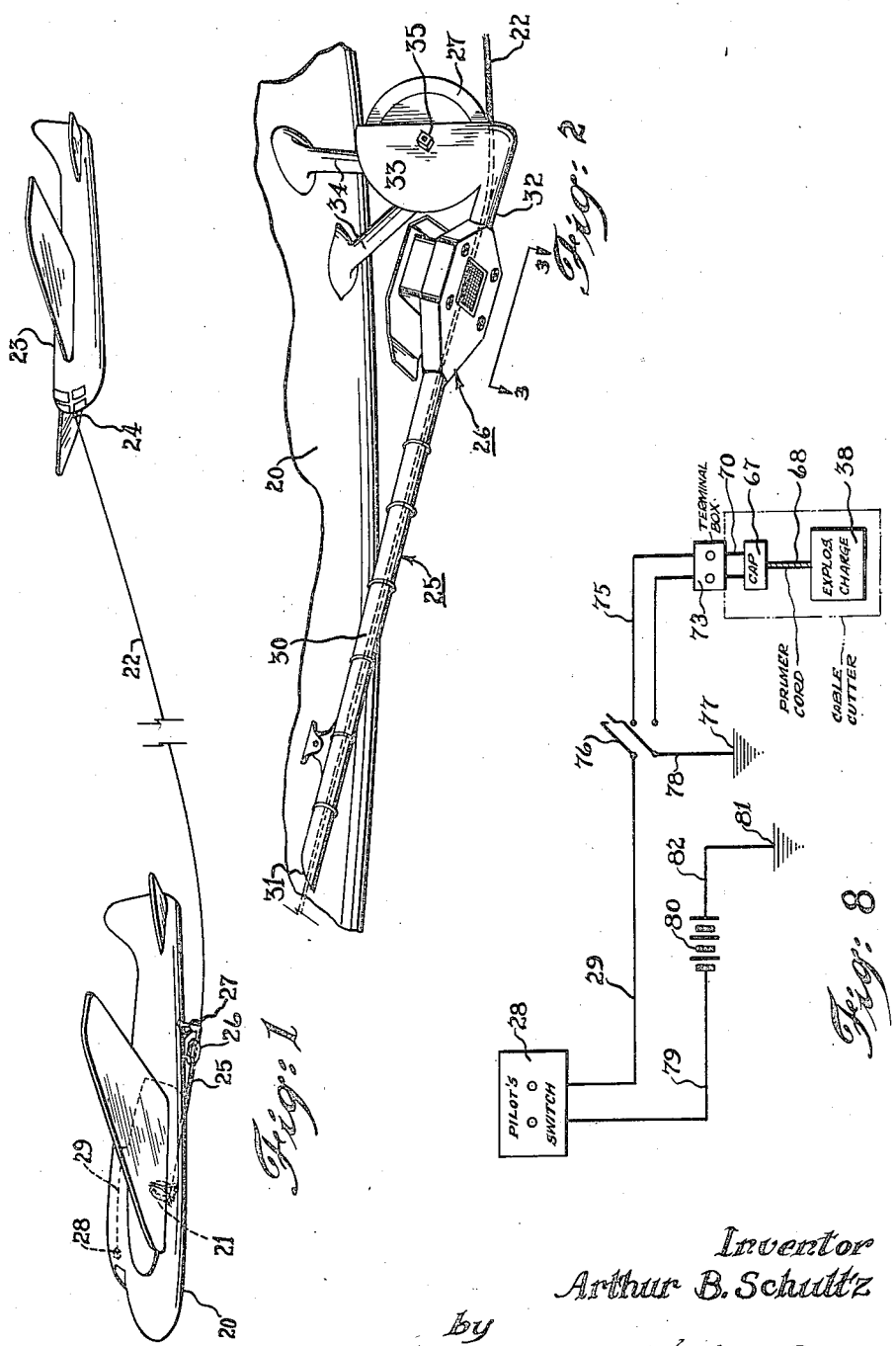

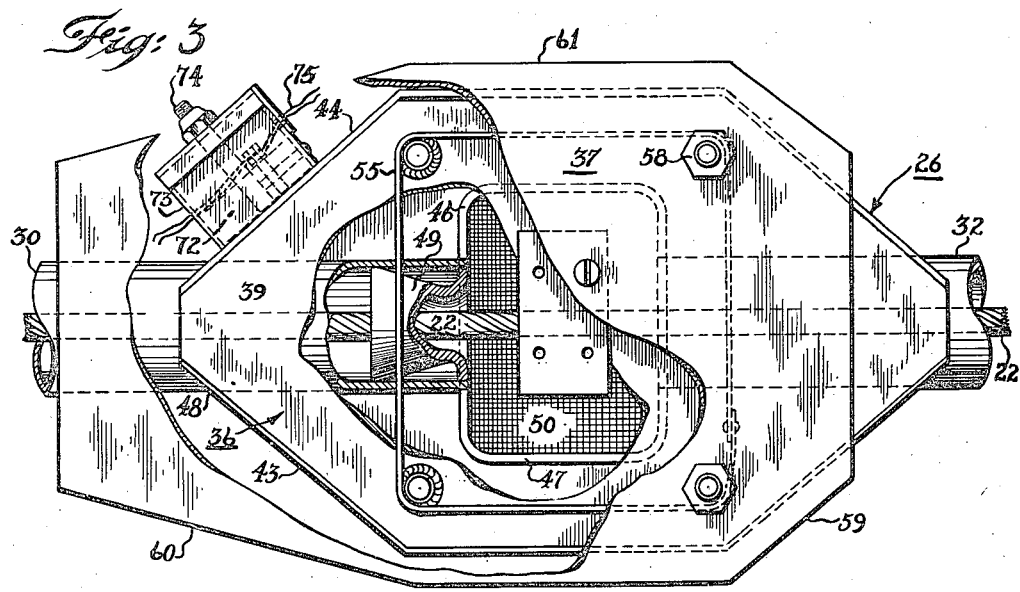
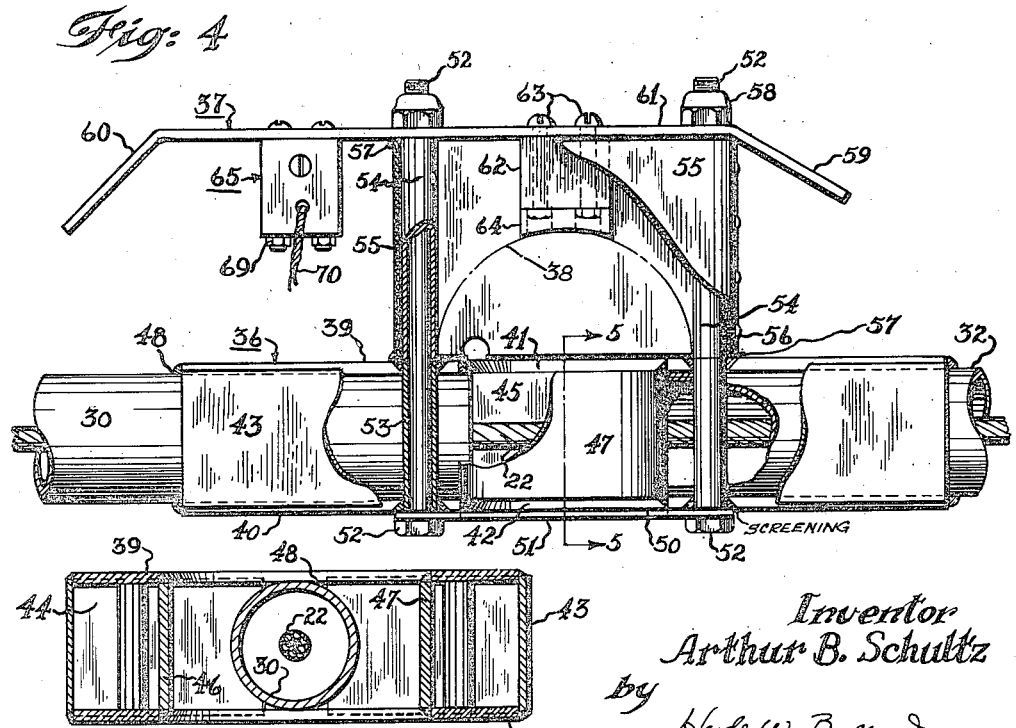

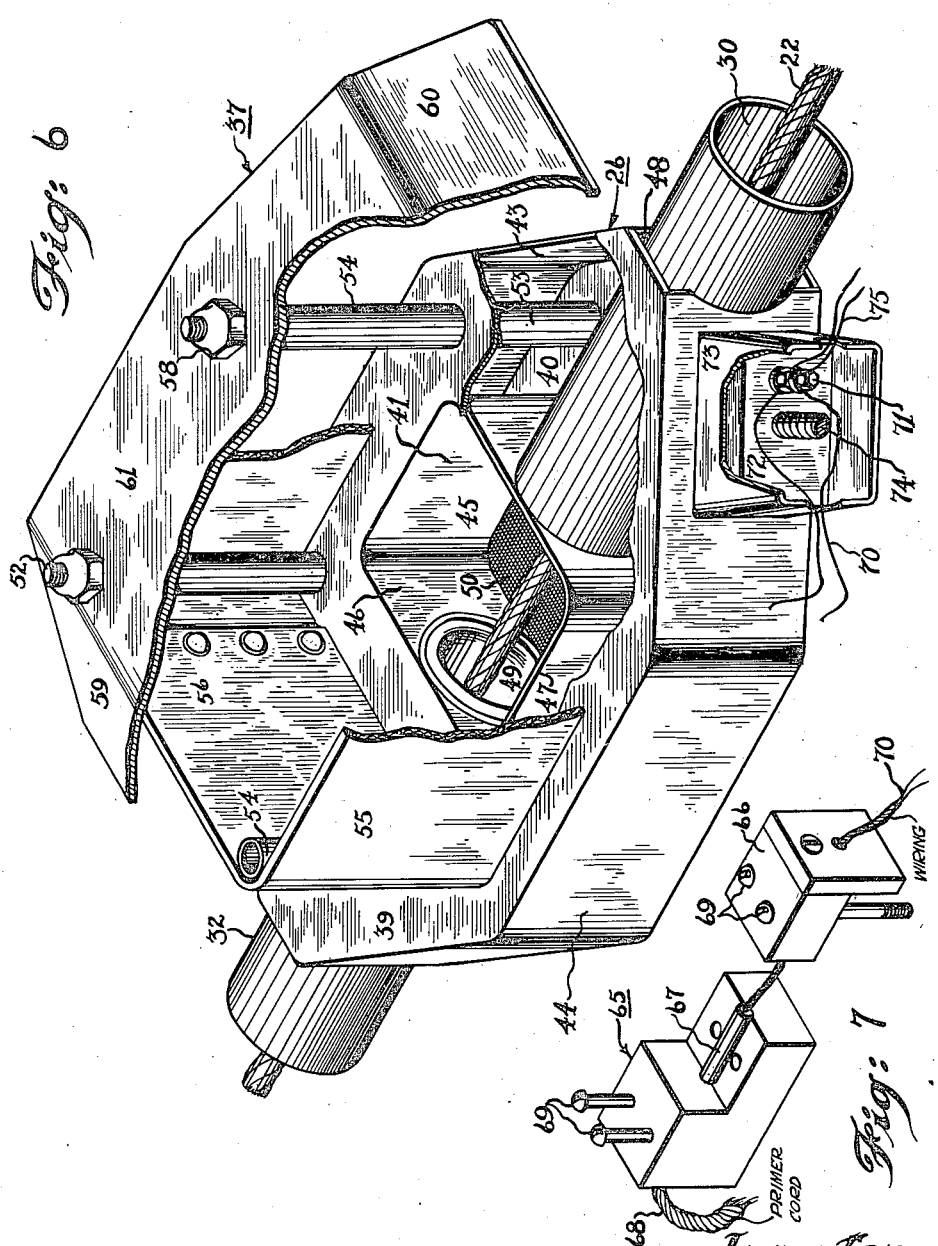

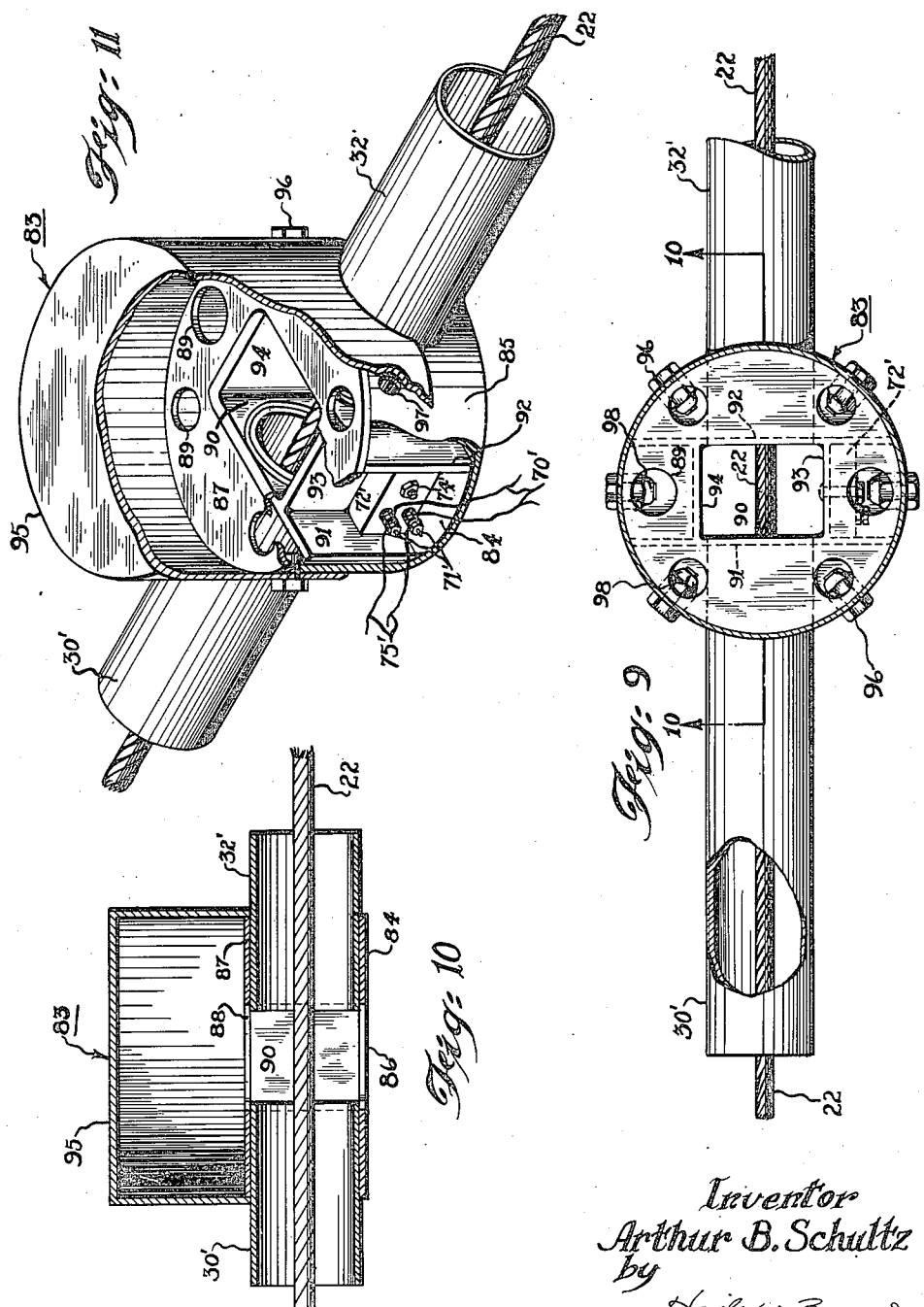

2,460,194

UNITED STATES PATENT OFFICE 2,460,194

APPARATUS FOR SEVERING TOWLINES AND THE LIKE

Arthur B. Schultz, Wilmington, Del., assignor to All American Airways, Inc., a corporation of Delaware Application October 10, 1944, Serial No. 558,022

1 Claim. (Cl. 164—34)

My invention relates to an emergency tow line cutter particularly adapted for instantly cutting the cable connecting a towing aircraft and one or more towed aircraft.

The towed aircraft may be a powered aircraft which is being towed to assist in take-off or flight, a powered aircraft with power source inoperative, or a glider. It also includes both heavier- and lighter-than-air craft.

For purposes of completeness, a glider pick-up and towing operation is described because the nature of this operation demands an instantaneous tow line cutting device, but it will be readily understood that my invention may be applied with equal success to other towing or pulling operations, whether on land, sea, or air and whether none, some, or all of the objects involved are vehicles. For example, the invention may be adapted for use in the drilling of wells and in the lumbering and construction industries.

A glider towing operation occurring in conjunction with a glider pick up, is one in which a glider tow line is suspended between vertical poles, enabling a powered aircraft or tug, flying low, to engage the glider tow line with some form of grapple or hook. The pick-up line attached to the pick-up hook pays out from an energy absorbing winch mounted in the tug to take up the shock of launching the glider. The tow line is normally attached to the glider by a release, which may be similar in construction to that disclosed in United States Patent No. 2,350,999 to John C. Beirise, issued June 13, 1944. By means of such a release mechanism, the glider pilot may cast off the towing connection at will. In an emergency, safety of personnel of both tug and glider requires that the tug pilot be able to release the cable without taking time to signal the glider pilot.

Various means of cutting the cable have been utilized, chiefly of the guillotine type. The inherent disadvantage of a mechanical cutting means is its unreliability and slowness of operation which render these devices of no value when life depends on the speed and reliability of the cutter. By electrically detonating an explosive charge, the pilot may sever the cable instantly. Since there are no movable parts nor complicated control linkages, the cutter is reliable, and not subject to unexpected failure. Due to the ease of remotely positioning an electrical control, the switch may be placed in the tug to suit the pilot's convenience.

The invention contemplates an electrically energized explosive cable cutter suitably located with a switch readily accessible to the pilot.

An object of the invention is to provide mounting means for an electrically energized cable cutting device.

Another object is to provide a cable cutter which may be remotely positioned yet directly controlled by the pilot of an aircraft.

Still another object is to provide a cable cutter free of mechanical or moving parts, which may be conveniently reloaded and reused.

A further object is to provide a remotely controlled cable cutter which may be installed and operated without injury to the structure of the aircraft and without undue danger to personnel.

A further object is to provide structural members of a cable cutter which direct and control the explosive force in the desired manner.

A still further object is to provide a structure which will reliably position a cable, hawser, rope or the like with respect to a charge and which will have sufficient strength and rigidity to withstand repeated detonations without bending or misaligning the cable guiding element.

Other objects and advantages of the invention will be apparent during the course of the following description.

Like reference numerals denote like parts in the several figures of the drawings.

In the drawings accompanying and forming part of this application, certain specific disclosure of the invention is made for purposes of explanation, but it will be understood that the details may be modified in various respects without departure from the broad aspect of the invention.

Fig. 1 is a somewhat diagrammatic perspective view of an aircraft towing a glider, the tug being equipped with a cable cutter in accordance with the invention.

Fig. 2 is a fragmentary perspective view of the cable cutter and cooperating parts installed on an airplane.

Fig. 3 is a plan view partly broken away of the cable cutter taken along line 3—3 of Fig. 2.

Fig. 4 is an elevation partly broken away of the cable cutter of Fig. 2.

Fig. 5 is a sectional view taken along line 5—5 of Fig. 4.

Fig. 6 is a fragmentary perspective view partly broken away of the cable cutter of Fig. 2.

Fig. 7 is a perspective view of a detail of the structure shown in Fig. 4.

Fig. 8 is an electrical wiring diagram of the connections between the cable cutter switch and the cable cutter.

Fig. 9 is a plan view of a modified form of cable cutter similar to that of Figs. 1–7.

Fig. 10 is a section taken along line 10–10 of Fig. 9.

Fig. 11 is a perspective view partly broken away of the structure shown at Figs. 9 and 10.

With specific reference to the drawings, tug 20 may be seen (Fig. 1) equipped with an energy absorbing winch 21 (shown in dotted lines) paying out tow line cable 22 attached to glider 23 by means of release 24. Hawse pipe 25, angularly disposed with respect to the tug and conventionally attached thereto as by brackets, protects and guides the cable 22 which passes through cable cutter 26 and around pulley 27. Electrical cable cutter switch 28 is shown (in dotted lines) located in the pilot's cabin with wiring 29 connecting the switch with the cable cutter detonator.

The cable guiding hawse pipe 23 (Fig. 2) may be made in two sections. An upper section 30 of the hawse pipe projects from the skin of the tug at 31 ending in the cable cutter proper 26. Lower section 32 of the hawse pipe connects the cable cutter with the pulley guard 33, supported by struts 34 which may be bracketed to the fuselage or dependent from some structural member (not shown) of the tug. Paying off from winch 21, cable 22 travels through hawse pipe 25 and cable cutter 26, riding in the groove of pulley 27 rotatably mounted in the pulley guard at 35.

For further details of the construction of the winch and the technique of a pick-up operation, reference is made to my co-pending application Serial No. 472,600, filed January 16, 1943, now Patent Number 2,433,488, issued December 30, 1947 which is hereby incorporated insofar as may be necessary to complete the disclosure.

The cable cutter 26 consists of a multisided open-centered box 36 and a suitably supported reflector 37 together with cooperating structure (Fig. 3). Mounted on the top of the box, between the box and reflector is an explosive charge 38 (shown by phantom lines in Fig. 4). The composition of the explosive charge is the invention of another.

Top and bottom plates 39 and 40 of the box proper may each be made from a rectangular sheet of metal or other strong material, with its corners cut away diagonally. Centrally located in these plates 39 and 40 are openings 41 and 42, respectively (Fig. 4). Side plates 43 and 44 are angularly bent to coincide with the sides of the top and bottom plates 39 and 40 and firmly attached thereto as by welding. The openings 41 and 42 in the top and bottom plates of the box provide upper and lower boundaries of a well-like central portion 45, whose sides are enclosed by strips 46 and 47, which may be of metal of U configuration to comform to the shape of openings 41 and 42.

Upper section 30 of the hawse pipe 25 is introduced into the cable cutter box through its open ends at 48, side plates 43 and 44 being suitably cut to permit passage of the hawse pipe which stops flush with U strips 46 and 47, whose ends are likewise cut semicircularly to admit the hawse pipe. Because of the this construction, the cable is exposed as it passes through the open well 45 in the center of the box. Since the charge is mounted directly above the well, the force of the charge travels towards the cable, severing it completely. The explosive force continues through the opening 42 in the bottom of the box, lessening the shock to the solid members of the cable cutter, which is firmly and rigidly held together as by welding. The cable is positioned in the hawse pipe by reducer 49 ending flush with the U strip side walls 46 and 47 of the well in the center of the box. The reducer is preferably of double funnel shape to facilitate insertion of the cable or hawser.

To protect the charge from foreign matter, a screen 50 may be provided, of ordinary wire mesh, held in place across the bottom of the well by an open-centered plate 51 attached to the cable cutter box by a plurality of bolts 52, passing through spacers 53, which may be suitably welded into countersunk holes in the top and bottom plates 39 and 40, if desired. These spacers 53 abut other spacers 54 mounted perpendicularly on the top plate 39 and so located with respect to its central axis that the charge 38 may be inserted between these spacers and held firmly thereby.

A fibre shield 55, bent rectangularly and fastened at its ends by rivets 56 to form a continuous strip, may be placed on top of the box, snugly enclosing the spacers 54, to provide additional protection for the charge, excluding dust and other harmful material. This shield may be sealed if desired by strips of rubber tape 57 overlapping its top and bottom edges.

The fuselage of the tug is protected by the shield 37, which may be a metal plate with truncated corners, secured to spacers 54 and bolts 52 by nuts 58 and having a rear portion 59 bent angularly downwards along a line just clearing the top edge of the shield (Figs. 2 and 4). This bent portion protects the pulley and pulley guard. The front portion 60 of the reflector is likewise bent angularly downward just past the forward edge of the box to assist in impelling the explosive force downwards away from the fuselage of the plane. The unbent portion 61 of the reflector lies in a plane parallel to the top and bottom plates of the cable cutter, and to give maximum protection, should lie in a plane approximately paralleling the nearest portion of the fuselage of the tug. As will be seen clearly in Fig. 2, it may be necessary to locate the box and reflector angularly with respect to the pulley and pulley guard.

The explosive charge is designed to give substantial unidirectional force and as a result the greatest portion of the blast is directed outwardly and downwardly away from the aircraft. The screen 50 and the fibre shield 55 will be shattered when detonation occurs; and consequently, must be replaced when a new charge is installed. A primary function, therefore, of shield 59 is to protect the thin skin of the airplane from becoming punctured or dented by fragments of the fibre shield and the covering for the charge 38. It will be understood that the shield can be dispensed with if the particular installation is of such a nature as to render this object unnecessary. As already noted, the shield 59 in combination with the fibre shield 55 and the screen 50 serve the important function of preventing mud and stones and foreign matter from entering the space around the cable and charge, which condition is likely to occur when the aircraft is taxied over muddy fields. They also prevent the possibility of a premature explosion, which may be caused by inexperienced personnel tampering with or attempting to clean the interior of the supporting structure.

To hold the top of the charge in position, a spacer block 62 is centrally located under the reflector to which it is suitably attached by screws and nuts 63. To prevent the screws from engaging the surface of the charge, a pad 64 of sponge rubber or other resilient material, having holes therein for passage of the screws, may be affixed to the bottom of the spacer block.

A generally rectangularly shaped block 65, bored at one end and equipped at the opposite end with a removable portion 66, (Fig. 7), is adapted to receive a blasting cap 67 and primer cord 68 and may be conveniently secured by bolts and nuts 69 to the underside of the reflector.

Wires 70 lead from the blasting cap 67 to terminals 71 located in a conventionally insulated terminal block 72 housed in a suitably covered terminal box 73 held by bolt 74 to a side of the cable cutter box. The lead wires 75, (Fig. 8) enclosed by protective tubing (not shown) run from the terminals to a knife switch 76 and thence wiring 29 leads from the knife switch to the pilot's switch 28 located in the pilot's compartment. As may be seen in Fig. 8, the knife switch is grounded at 77 through wiring 78. Wire 79 connects the pilot's switch with power source 80, which is grounded at 81 through wiring 82.

To assemble the cutter for operation, the following procedure is followed:

The screen and screen retainer are placed against the bottom of the box, the bolts are slipped through corresponding holes in the screen retainer and in the top and bottom of the box. A spacer is slipped over the upward protruding end of each bolt and the shield is placed over the bolts and the spacers rest on top of the box. After the cushioning block has been bolted to the reflector with the screws and nuts provided, and the charge has been positioned on the top side of the cable cutter box, wedged between the bolts and spacers, the reflector is fitted over the projecting bolts and held in place by nuts. The blasting cap is placed in its holder in contact with the primer cord and the wiring is threaded through the holder and through protective tubing if desired. After turning off the knife switch and testing for current to make certain that the wires are not live, the wires from the blasting cap are attached to the terminals. The operator should hold the blasting cap well away from his face during this operation. The removable portion of the holder is bolted into its mating position attached to the reflector. An insulating tube protecting the wiring may be clipped to the cable cutter and the terminal box cover bolted in position.

Now the cable cutter is ready for use, and should it be necessary for the tug pilot to cut his aircraft loose suddenly from the glider, he throws the electrical switch in his compartment, the current explodes the blasting cap, setting fire to the primer cord, which in turn ignites the explosive charge, severing the portion of the cable which lies exposed in the open well of the cable cutter box.

If desired, the cable cutter may be modified to provide an integral shield and reflector bolted to the cable cutter in the manner previously described having a detonator integral with the charge. The cable cutter 83, shown in Figs. 9–11, is similar to the cutter 26 of Figs. 1–7, having, however, a cylindrical container which may be of welded construction and utilizing a charge provided with an integral detonator.

Centrally located in bottom plate 84 of cylindrical housing 85 is an oblong opening 86 similar to opening 42 of cable cutter 26. Circular top plate 87 is provided with like opening 88, as well as a plurality of radial holes 89. The openings 88 and 86 furnish upper and lower boundaries respectively of a central well 90, similar to well 45 of cable cutter 26. Two sides of the well are formed by transverse plates 91 and 92, positioned vertically and at right angles to the longitudinal axis of the cable cutter, extending athwart the circular bottom plate 84 and touching the cylindrical housing 85. The other two sides of well 90 are provided by side plates 93 and 94 placed at right angles to transverse plates 91 and 92, which are provided with openings adapted to receive hawse pipe members 30' and 32'. If desired, a reducer (not shown) may be used within hawse pipe members to guide the cable 22 as it passes through the cable cutter.

Terminal block 72' to which are attached terminals 71' may be held by screw 74' to either side plate 93 or 94. The explosive charge, which may be made in two sections, is placed on top plate 87 of the housing, and wires 70' leading from the detonator are attached to the terminals. To hold the charge in place, protecting the fuselage of the aircraft from the explosion, the hollow cylindrical cover 95 may be lowered over the charge and the housing and held in by a plurality of bolts 96 passed through radial holes 97 in housing and cover. Nuts 98 are preferably tack welded to the inside of the housing to facilitate positioning after the cover is in place. The explosive force of the charge travels downwards through the open well 90, shattering the cable as it runs exposed through the center of the cutter. If desired, screening may cover the lower opening of the well.

The electrical arrangement is similar to that described in connection with Fig. 8. Tubing may protect the wires 75' (75 in the wiring diagram) leading from the terminals to the knife switch 76, which is grounded at 77. From the pilot's switch 28, line 29 leads to the knife switch, and line 79 to the power source 80, which is grounded at 81.

In both forms of my invention, it will be noted that I have designed the main supporting structure to be attached at a point spaced away from the ends of the cable guiding tubing and that this supporting structure is carried out and around the area where the main force of the explosion occurs. This is true both for the circular and hexagonal forms. The object of this construction is to prevent the entire hawse pipe from becoming or getting out of alignment when the charge is detonated. Secondary aligning and strengthening means are provided at the ends of the tubes themselves so that it will be seen that I have provided both primary and secondary connecting and strengthening members. The circular modification will have advantages in the larger sizes since greater strength can be obtained for proportionately less weight. It will also be noted that my cable cutter in either form is designed to sever the cable whether it be moving or stationary with respect to the supporting structure and hawse pipe; and although I have illustrated a form of structure designed to be inserted in a tubular guiding member having substantially uniform construction from one end to the other, it will be obvious that the cable guiding means at one end of the cutter does not have to be exactly the same as the corresponding guiding means at the other end of the cutter.

Generally speaking, an emergency cable cutter would be installed at the towing end of the cable because, ordinarily, the pilot of the towed craft can operate the standard release whenever he chooses. Nevertheless, it will be appreciated it may be desirable to equip the towed aircraft with an emergency cutter in the event that the ordinary release should fail.

I have thus described an explosive cable cutter, which is positive in operation, capable of instantaneous operation, and which is relatively inexpensive to manufacture. In this connection, it may be cheaper to fabricate the box structure for supporting the charge and for connecting the cable guiding means out of a solid block of metal or other suitable material simply by drilling and welding in the proper locations. This construction would, however, unnecessarily increase the weight, a decided disadvantage for aircraft installations, but possibly of no consequence if the cable cutter is to be used on the ground, on boats, or on land vehicles. An appreciation of the weight which could thus be saved is apparent from the fact that I use $\frac{1}{8}$ inch chrome-molybdenum (X-4130) connecting plates and .065 inch chrome-molybdenum side plates in a cable cutter that will successfully withstand the charge necessary to completely sever a $\frac{7}{16}$ inch steel cable when it is either moving through the cutter or stationary.

Having thus described my invention, I claim:

In supporting structure for explosively severing cables and the like, a first tubular cable guide, a second tubular guide in alignment with said first guide, the ends of said guides being in spaced relation, a pair of connecting plates between said guides rigidly attached thereto at a distance from said ends, side plates welded to said connecting plates forming a rigid enclosure therewith, a cable guiding restriction at the end of each tubular guide, a secondary supporting collar welded to each end of said guides, an explosive charge positioned over said secondary collar, means for detonating said explosive charge including a length of primer cord and a blasting cap, resilient holding means for said charge, a first shield positioned in spaced relation to said explosive charge, means for supporting said shield on said connecting plates, and means for protecting said charge and secondary collar including a screen and a readily frangible shield, said frangible shield enclosing the space between said collar and said first shield.

ARTHUR B. SCHULTZ.

REFERENCES CITED

The following references are of record in the file of this patent:

UNITED STATES PATENTS

| Number | Name | Date |
| --- | --- | --- |
| 1,312,405 | Landler | Aug. 5, 1919 |
| 1,418,783 | Fokker | June 6, 1922 |
| 1,641,483 | Greene | Sept. 6, 1927 |
| 1,672,163 | Krammer | June 5, 1928 |
| 2,302,647 | Temple | Nov. 17, 1942 |
| 2,415,814 | Davis | Feb. 18, 1947 |
| 2,443,276 | Seevers | June 15, 1948 |